(12) United States Patent
Alexander et al.

(10) Patent No.: US 11,663,781 B1
(45) Date of Patent: May 30, 2023

(54) ENHANCEMENTS TO VIRTUAL OR AUGMENTED REALITY ENVIRONMENTS

(71) Applicant: INTERNATIONAL BUSINESS MACHINES CORPORATION, Armonk, NY (US)

(72) Inventors: Lincoln A Alexander, Westford, MA (US); Laura Janet Rodriguez, Durham, NC (US); Robert E. Loredo, North Miami Beach, FL (US); Jaclyn Wakin, Raleigh, NC (US); Hemant Kumar Sivaswamy, Pune (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/457,040

(22) Filed: Dec. 1, 2021

(51) Int. Cl.
*G06T 19/00* (2011.01)
*G06N 20/00* (2019.01)
*G06V 20/64* (2022.01)
*G06V 20/20* (2022.01)

(52) U.S. Cl.
CPC ........... *G06T 19/003* (2013.01); *G06N 20/00* (2019.01); *G06T 19/006* (2013.01); *G06V 20/20* (2022.01); *G06V 20/64* (2022.01)

(58) Field of Classification Search
CPC ..... G06T 19/003; G06T 19/006; G06N 20/00; G06V 20/20; G06V 20/64
See application file for complete search history.

(56) References Cited

U.S. PATENT DOCUMENTS

| 5,564,004 A | 10/1996 | Grossman |
| 5,754,179 A | 5/1998 | Hocker |
| 10,127,706 B2 | 11/2018 | Jones |
| 11,335,077 B1 * | 5/2022 | Salmani Rahimi ..... G06T 17/20 |

(Continued)

FOREIGN PATENT DOCUMENTS

| JP | 5117452 B2 | 1/2013 |
| KR | 20080078815 A | 8/2008 |

OTHER PUBLICATIONS

Ahn et al., "Supporting Healthy Grocery Shopping via Mobile Augmented Reality." ACM Trans. Multimedia Comput. Commun. Appl., vol. 12, No. 1s, Article 16, Oct. 2015, pp. 16-16:24.

(Continued)

*Primary Examiner* — Doon Y Chow
*Assistant Examiner* — Dennis Chow
(74) *Attorney, Agent, or Firm* — David Spalding

(57) ABSTRACT

A computer-implemented method, a computer system and a computer program product enhance user interaction with a virtual or augmented environment. The method includes obtaining a user profile. The user profile includes a constraint of a user. The method also includes identifying a plurality of objects in the augmented reality environment. In addition, the method includes determining an intent of the user with respect to navigating the augmented reality environment. The method further includes calculating a probability of interaction between the user and an identified object based on the intent. Lastly, the method includes generating an enhancement threshold for each of the identified objects based on the probability of interaction and the constraint of the user.

20 Claims, 5 Drawing Sheets

(56) References Cited

U.S. PATENT DOCUMENTS

| | | | |
|---|---|---|---|
| 2012/0038669 A1* | 2/2012 | Lee | G06T 19/006 |
| | | | 345/633 |
| 2013/0085345 A1 | 4/2013 | Geisner | |
| 2014/0300532 A1* | 10/2014 | Karkkainen | G06F 3/015 |
| | | | 345/156 |
| 2020/0058064 A1 | 2/2020 | Zises | |
| 2021/0004995 A1 | 1/2021 | Burg | |

OTHER PUBLICATIONS

Disclosed Anonymously, "Augmented Reality System for Alzheimer Disease Patients using Facial Recognition," IP.com, IP.com No. IPCOM000251927D, IP.com Publication Date: Dec. 11, 2017, 2 pages.

Mell et al., "The NIST Definition of Cloud Computing", National Institute of Standards and Technology, Special Publication 800-145, Sep. 2011, 7 pages.

Tanuwidjaja et al., "Chroma: A Wearable Augmented-Reality Solution for Color Blindness." ACM, Ubicomp'14, Sep. 13-17, 2014, http://dx.doi.org/10.1145/2632048.2632091, 12 pages.

Zhao, "Designing Augmented Reality Systems to Empower People With Low Vision," Ph.D. Dissertation, Cornell University, Aug. 2020, 263 pages.

* cited by examiner

ENHANCEMENTS TO VIRTUAL OR AUGMENTED REALITY ENVIRONMENTS

BACKGROUND

Embodiments relate generally to providing enhancements to virtual or augmented reality environments, and more specifically to enhancing objects in the user's view of the augmented reality environment based on a probability of user interaction.

Augmented reality (AR) technology may provide a real-time view of a physical, real-world environment whose elements are augmented with computer-generated virtual elements, which may include sound, video, graphics and/or positioning data. For example, mobile computing devices may provide augmented reality applications that allow users to see an augmented view of a surrounding real-world environment through a camera of the mobile computing device, where an application may overlay the camera view of the surrounding environment with location-based data, such as local shops, restaurants and movie theaters. In addition to mobile computing devices, a user may wear a headset or other apparatus that may be used to view the enhanced environment.

SUMMARY

An embodiment is directed to a computer-implemented method for enhancing user interaction within an augmented reality environment. The method may include obtaining a user profile, where the user profile includes a constraint of a user. The method may also include identifying a plurality of objects in the augmented reality environment. The method may further include determining an intent of the user with respect to navigating the augmented reality environment. In addition, the method may include calculating a probability of interaction between the user and an identified object based on the intent. Lastly, the method may include generating an enhancement threshold for each of the identified objects based on the probability of interaction and the constraint of the user.

In another embodiment, the method may include predicting a path of the user in the augmented reality environment based on the intent. The method may also include generating a weight for each identified object along the predicted path. Lastly, the method may include applying the weight to the calculation of the probability of interaction between the user and the identified object.

In a further embodiment, the method may include using a machine learning classification model to predict the intent of the user with respect to navigating the environment.

In yet another embodiment, determining the intent of the user may include monitoring user movements in the augmented reality environment and updating the intent of the user based on the user movements in the augmented reality environment.

In an additional embodiment, generating an enhancement threshold may include determining whether the constraint of the user applies to the identified object and updating the enhancement threshold for the identified object based on the constraint of the user in response to determining that the constraint applies.

In another embodiment, the method may include updating the user profile to include the intent of the user.

In a further embodiment, the method may include updating the user profile to include the calculated probability of interaction between the user and the identified object.

In addition to a computer-implemented method, additional embodiments are directed to a system and a computer program product for enhancing content submissions of support chats.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
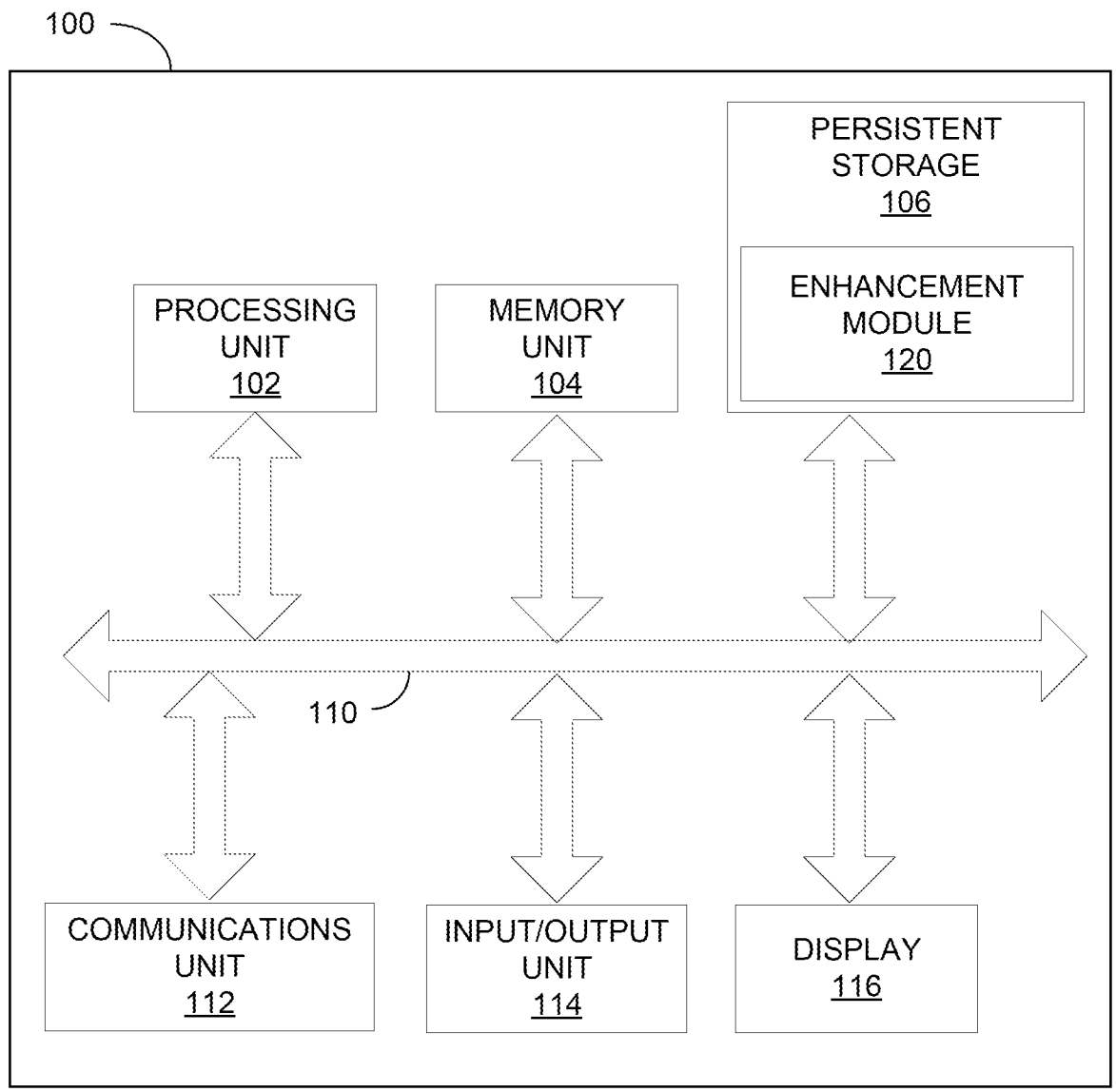
FIG. 1 depicts a block diagram of an example computer system in which various embodiments may be implemented.

Technology advancements may enable access to more sophisticated ways to assist people in their everyday lives. For instance, the rendering of virtual reality or augmented reality environments may be more prominently used in completing routine tasks such as grocery shopping or in enhancing activities where people with different physical capabilities may compete on a more even standing. An augmented reality (AR) interface with a headset, also known as AR "glass," may be provided to the user. AR may offer a real-time view of a physical, real-world environment whose elements are "augmented" by computer-generated sensory input such as sound, video, graphics and positioning data. A display of the surrounding area near a user may be enhanced by augmented data pertinent to the surrounding area using an augmented reality device. An augmented reality application may use images in the surrounding environment from a camera, which may also determine the user's position based on global positioning satellite (GPS) data, triangulation of the device's location, or other positioning methods. The application may then overlay the camera view of the surrounding environment with location-based data such as local shops, restaurants and move theaters as well as the distance to landmarks, cities and the like. Virtual reality environments may be rendered and exposed to users in much the same way, except that instead of displaying the surrounding area as the background, an entirely artificial environment may be rendered by a virtual reality application with similar enhancements made to the objects in the field of view.

In augmented or virtual reality scenarios, users with accessibility challenges may have specific physical constraints that may make the use of a virtual or augmented environment difficult. For example, a color-blind person in a grocery shopping context may not be able to tell if produce is ripe because the person cannot see specific colors such as green. In such a scenario, a virtual or augmented reality application may be able to provide static information for specific constraints, meaning that they could have a setting that adjusts colors for objects in a specific field of view, but rendering and loading such an application may be costly, particularly if the application needed to dynamically change what is rendered and loaded on the screen if the user were to change their path after the application.

It may be advantageous to provide a method for informing a virtual reality or augmented reality application about enhancements of objects in the field of view of a user. Such a method may produce a numerical threshold that the application may use to determine whether to enhance an object or some other guidance that may be usable by the application. Such a method may be aware of physical constraints of the user that may be relevant to the rendering and loading of the environment and determine an intent of the user, in addition to predicting a path that the user may follow. Such predictions of intent or a physical path may assist the method in weighting its calculations to account for the actions of the user. From these predictions and an awareness of the objects in the field of view within the virtual reality or augmented reality environment, a probability of user interaction may be calculated for each visible object and the method may produce relevant guidance for enhancing objects within the environment based on the probability that a user may interact with the object. Such a method may improve a user's experience with virtual reality or augmented reality environments and also improve the ability of an application to understand the use of its environment and adjust to specific users and the movements of users within the environment.

Referring now to FIG. 1, there is shown a block diagram illustrating a computer system 100 in accordance with an embodiment. Examples of a computer system 100 include: a mobile phone, smart phone, tablet, laptop, a computing device embedded in a vehicle, a wearable computing device, virtual or augmented reality glasses or headset, and the like. It should be appreciated that FIG. 1 provides only an illustration of one implementation and does not imply any limitations with regard to the environments in which different embodiments may be implemented. Many modifications to the depicted environments may be made based on design and implementation requirements.

As shown, a computer system 100 includes a processor unit 102, a memory unit 104, a persistent storage 106, a communications unit 112, an input/output unit 114, a display 116, and a system bus 110. Computer programs such as 120 may be stored in the persistent storage 106 until they are needed for execution, at which time the programs are brought into the memory unit 104 so that they can be directly accessed by the processor unit 102. The processor unit 102 selects a part of memory unit 104 to read and/or write by using an address that the processor unit 102 gives to memory unit 104 along with a request to read and/or write. Usually, the reading and interpretation of an encoded instruction at an address causes the processor unit 102 to fetch a subsequent instruction, either at a subsequent address or some other address. The processor unit 102, memory unit 104, persistent storage 106, communications unit 112, input/output unit 114, and display 116 interface with each other through the system bus 110.

Examples of computing systems, environments, and/or configurations that may be represented by the data processing system 100 include, but are not limited to, personal computer systems, server computer systems, thin clients, thick clients, hand-held or laptop devices, multiprocessor systems, microprocessor-based systems, network PCs, mini-computer systems, and distributed cloud computing environments that include any of the above systems or devices.

Each computing system 100 may also include a communications unit 112 such as TCP/IP adapter cards, wireless Wi-Fi interface cards, or 3G or 4G wireless interface cards or other wired or wireless communication links. Communication between mobile devices may be accomplished via a network and respective network adapters or communication units 112. In such an instance, the communication network may be any type of network configured to provide for data or any other type of electronic communication. For example, the network may include a local area network (LAN), a wide area network (WAN), a virtual private network (VPN), a mobile or cellular telephone network, the Internet, or any other electronic communication system. The network may use a communication protocol, such as the transmission control protocol (TCP), the user datagram protocol (UDP), the internet protocol (IP), the real-time transport protocol (RTP) the Hyper Text Transport Protocol (HTTP), or a combination thereof.

Figure 2:
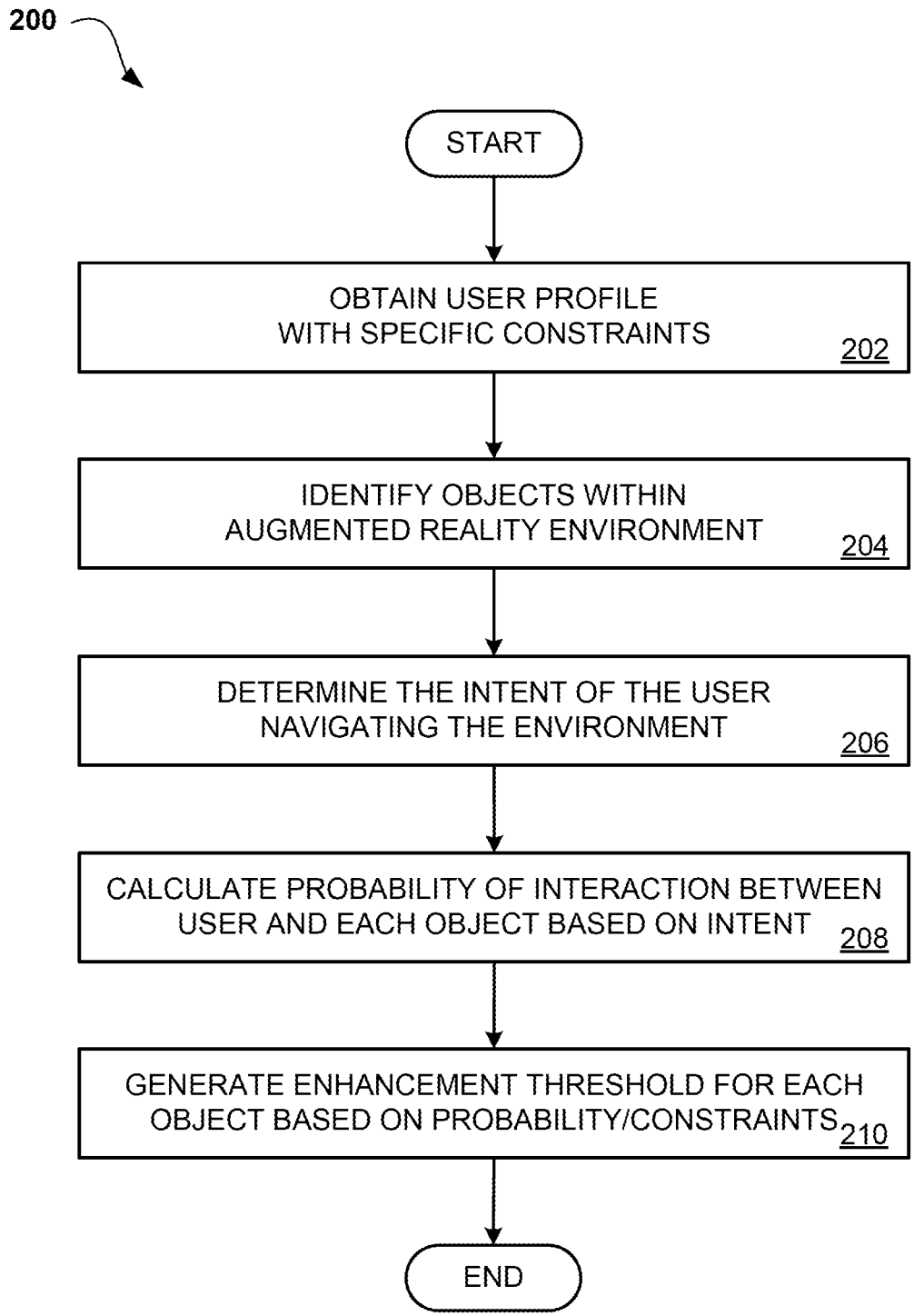
FIG. 2 depicts a flow chart diagram for a process to provide guidance for enhancing user interaction with a virtual reality or augmented reality environment according to an embodiment.

Referring to FIG. 2, an operational flowchart illustrating a process 200 to provide guidance for enhancing user interaction with a virtual reality or augmented reality environment is depicted according to at least one embodiment. At 202, a user profile may be obtained with details about the user, including specific constraints on user interactions with a virtual or augmented reality environment. A non-exhaustive list of example physical constraints for users may include impairments related to vision, e.g., color blindness, hearing, thinking, speech, e.g., an accent or other distinguishing characteristic of one's voice, learning, movement, mental health, memory, communicating or social relationships. One of ordinary skill in the art may recognize that there are many ways for a user to be constrained when interacting with a virtual or augmented reality environment and also multiple ways for reducing or compensating for the constraints.

Figure 3A:
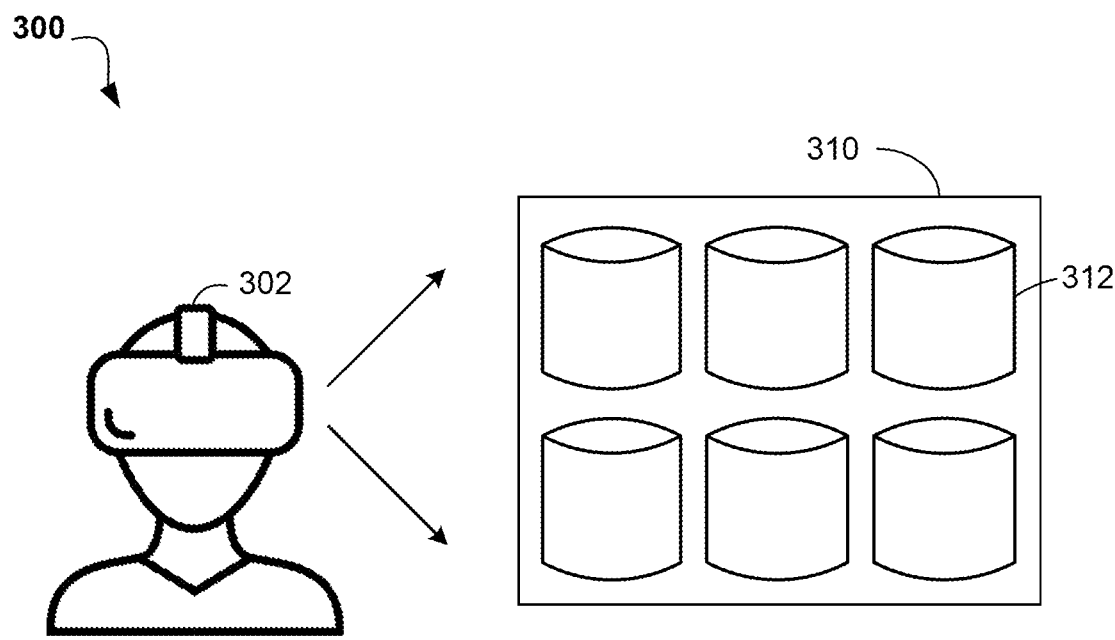
FIGS. 3A and 3B depict a block diagram of a computing system that may be used to provide guidance for enhancing objects within an augmented reality environment that is consistent with supplied user constraints according to an embodiment.
Figure 3B:
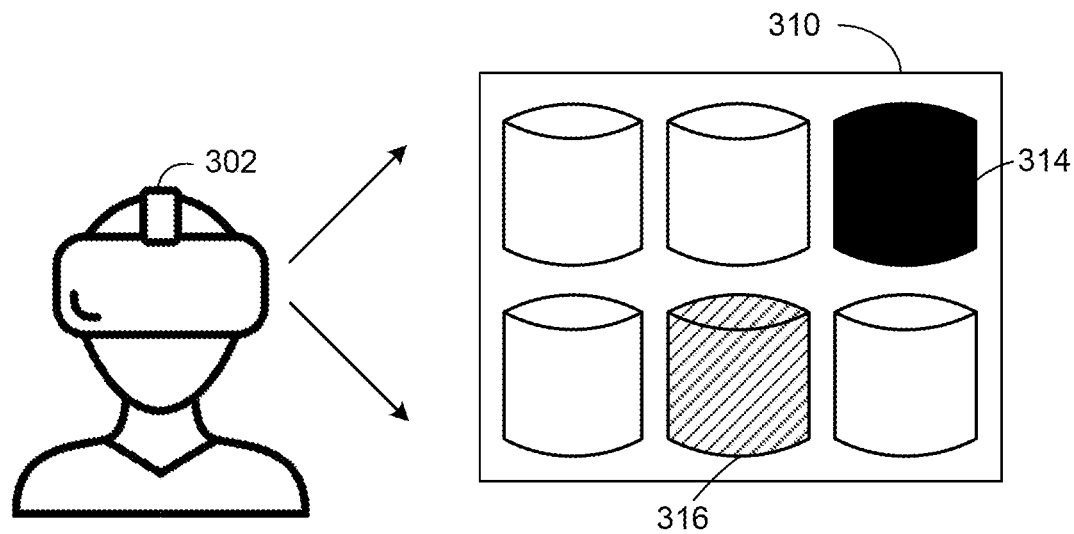

Some examples for how these constraints may be reduced in the context of colorblindness, e.g., the example below, may include enhancing the colors of objects to make the object easier for the user to see or, alternatively, changing the color of an object in a user's field of view to something that the user can see, e.g., using blue and yellow if the user cannot see red and green. As another example, in the case of a virtual reality gaming environment and players with varying physical abilities, adjusting the size or shape of objects may be done to equalize the game among users. Enhancements or other adjustments to objects in the environment may be based on specific constraints that are identified for a user but also may be initiated or adjusted based on various situations that may arise during the use of the augmented reality or virtual reality environment. The augmented or virtual reality system may additionally learn specific constraints of the user based on adjustments made by the user during use of the system. For example, if the user changes direction while walking or if there is unusually low lighting detected in a surrounding area, a constraint of the user, e.g., an inability to see well in dimly lit spaces, may be accounted for by the module. In another scenario, if a user who is color-blind is determined to be driving at high speed toward a red light, there may be a need to enhance a traffic light in the environment as a safety precaution. In addition, the module may be able to determine the proper enhancement from prior history with the surrounding area and the augmented reality environment. In the example of FIGS. 3A and 3B, if the colorblind user frequents the same grocery store, the module may know that objects in the field of view do not need any enhancement because the grocery store layout hasn't changed, and the user is familiar with the environment. The same colorblind user may also prefer certain clothing and may use settings in a profile to customize their view in the environment to recognize their preferred clothing. In addition to remembering prior history, there may be a maximum time that is configurable for retaining said memory, such that the enhancements may be restored to the objects if it has been an exceptionally long time since the user experienced the environment.

Other examples include enhancing certain objects for a user with memory problems to assist with remembering a to-do list or removing or de-emphasizing certain objects that may raise stress levels for a user if the user's heart rate is already above a threshold. In addition, entrances to a building that are more accessible may be enhanced or highlighted for a user that may be unable to walk, or this type of enhancement may be removed if it is recognized that the user has prior experience with the building.

At 204, objects within a rendered virtual reality or augmented reality environment may be identified. As an example, if the user enters a grocery store while wearing an augmented reality headset, an augmented reality application may render an augmented reality environment representing the grocery store to the user. The rendering of the environment may include projecting images of the grocery store and overlaying any enhancements that the augmented reality application may be programmed to provide, e.g., the enhancements described above in 202. Within the surrounding area, and therefore also in the rendered environment, may be several objects, e.g., various fruits and vegetables such as apples or lettuce if the user is in the produce department of a grocery store. In the process of receiving the rendered environment, the objects within the environment may be specifically identified using computer vision techniques such as object recognition or character recognition. This identification may be correlated to specific user constraints and user intents, as mentioned in more detail below, and used to guide decisions about enhancement of the objects within the augmented reality environment.

The augmented reality application may recognize the environment if the user has previously visited the grocery store and automatically add enhancements to the field of view, such as text describing objects that are recognized or other details that the user may wish to see. Alternatively, the augmented reality application may scan the received images for objects using computer vision techniques and, through object recognition algorithms, analyze the environment to display enhancements to the objects that may be recognized. It is important to note that enhancements to objects need not only be text annotations or the like but, rather, may also include enhancements or alterations of the objects themselves to make them more visible. For instance, if the object is a green apple and the user cannot see green, then the object may be altered within the augmented reality environment to be red or another color so that the object may be seen.

At 206, an overall user intent in navigating the environment may be determined and this intent may also be used to derive an intent with respect to each of the identified objects in the environment. An intent may be manually uploaded to the module, e.g., a grocery list in preparation for a shopping trip, either on its own or as a part of the user's profile, but it is not required that the user has an explicit intent before entering the augmented reality environment. A default intent may be used, such that whenever a user visits a specific environment, the default intent is used. In an embodiment, intent may be predicted by monitoring the user's movements, e.g., eye movements to learn where the user may be looking or body movements to learn the direction that the user may be heading. For instance, a user may be walking, or simply looking, towards the apples in a grocery store, so the user's intent may be predicted as "picking an apple" or more generally as "shopping for produce."

In an embodiment, a supervised machine learning classification model may be trained to predict user intent. One or more of the following machine learning algorithms may be used: logistic regression, naive Bayes, support vector machines, deep neural networks, random forest, decision tree, gradient-boosted tree, multilayer perceptron, and one-vs-rest. In an embodiment, an ensemble machine learning technique may be employed that uses multiple machine learning algorithms together to assure better prediction when compared with the prediction of a single machine learning algorithm. In this embodiment, training data for the model may include explicit information from a user, such as an indication that the user is intending to perform a certain task. Training data may also include monitoring of user movements, such as walking in a specific direction or turning of the user's head to look in a specific direction, each of which may infer a user's intent in navigating the environment. Training data may also include prior usage of the environment in various contexts, e.g., if a user frequents a specific store, objects may be recognized, and probability of interaction may be inferred from the prior visits. The training data may be collected from a single user or a group of users, with user consent required prior to collection of any training data. The classification results may be stored in a database so that the data is most current, and the output would always be up to date.

The intent of the user may be used to predict a user's path through the environment and create a weighted map of the augmented reality environment that overlays the user's intent with respect to each object in the field of view. In other words, if the user has a specific intent, e.g., "shopping for produce," then the map may apply a weight to objects that are identified as related to that intent, e.g., produce items, which may indicate a higher likelihood that the user will interact with that object. This map may be dynamically adjusted as the user's intent may change, meaning that changes in user movements, such as walking or looking in a different direction for a sufficient time or detecting a pause or an increase in the user's velocity, may also be used to make changes in the map and the weights applied to objects in the environment for adjusting the likelihood that a user will interact with a specific object. The environment may also be mapped with the center around the user's path to keep close attention to the user's movements and adjust the map accordingly.

It should be noted that a user's intent may not be limited to a path through an environment. In another example, a virtual competition in a virtual reality game may have multiple players and the game may include multiple strategies that may be employed by the players. For instance, in certain games such as curling, a player may wish to score points by sliding a stone onto the target. However, because the scoring may include the closest to the target at the end, there may also be an advantage in leaving an obstruction in front of the target to block others from scoring and be the closest at the end or there may be an advantage in pushing another player's token away from the target. These strategic decisions may be intents of a user in playing this game in a virtual reality or augmented reality environment and, as the game progresses, this intent or strategy may dynamically change just as the predicted path described above may change.

It is also important to note that any monitoring and collection of data about a user as mentioned herein requires the informed consent of all those people whose data is captured for analysis. Consent may be obtained in real time or through a prior waiver or other process that informs a subject that their data may be captured by appropriate devices or other sensitive personal data may be gathered through any means and that this data may be analyzed by any of the many algorithms that may be implemented herein. A user may opt out of any portion of the monitoring at any time.

At 208, the probability of a user interacting with a specific object may be calculated based on the determined intent. While the intent may be determined for a user and also objects, the probability that may be calculated at 208 is done for each identified object in the environment. Using the predicted path of the user and the weighted map, a probability that the user will interact with a specific object may be calculated that also incorporates the weighting as received from the map of the environment. This probability may be calculated on an object-by-object basis, such that the enhancement module may understand the likelihood of the user interacting with each object in the augmented reality environment. As the intent may dynamically change, the probability of user interaction may also dynamically change based on the user movements described in 206 and any other factors in the environment that may arise.

At 210, an enhancement threshold may be generated for each object in the environment for the purpose of determining whether a specific object that has been identified should be enhanced in some fashion. One of ordinary skill in the art may recognize that this threshold may exist in many forms as the dynamic limiting threshold may be provided to a secondary system, which could notify, alert, or react to the environment platform accordingly based on the position around the threshold. In accomplishing this, the enhancement module may now understand from the probability in 208 which objects in the augmented reality environment the user will likely encounter and may also apply the constraints in the user profile to determine which of those objects may require enhancement. For example, if the user is looking at the apples and walking in that direction, the apples in the field of view of the user may have a high probability of interacting with the user. In addition, it may be detected that the apples are green and should have the color changed because the user cannot see green. The high probability of interaction, in tandem with the known constraints of the user, may cause the enhancement module to generate a threshold that may notify the secondary system to enhance the apples within the augmented reality application, e.g., display a different color and note the change to the user.

The enhancement module may analyze the individual objects that may be visible to the user in the augmented reality environment to determine how the user's constraints, as received from the user's profile, may affect a potential interaction with that object. For instance, if the object is a green apple and the user cannot see green, then the object may be altered within the augmented reality environment to be red or another color so that the object may be seen. This enhancement may also include text on the screen to indicate that the enhancement has occurred so that the user may be aware of the actual state of the object.

In step 210, feedback may also be provided to refine the predictions of which enhancements may be required for a specific object. For instance, the user may visit the produce section at a specific grocery store multiple times and take a certain path each time. This behavior may be learned and the probability of interacting with an object may be adjusted such that a user is most likely to interact with certain objects that they prefer. In the context of the threshold, if the user commonly buys certain items and they would normally be enhanced, the objects may no longer need enhancement because the user is familiar with the object's appearance and location in the environment.

Referring to FIGS. 3A and 3B, an example 300 of enhancing a user interaction with an augmented reality environment is shown according to an embodiment. In FIG. 3A, a user 302 may enter a grocery store wearing an augmented reality device, which may render augmented reality environment 310. If the user approaches one of the shelves, the user may have a choice between products such as canned items 312. FIGS. 3A and 3B show six such items for illustrative brevity but there may be several items on an actual shelf, each of which may have different packaging, including a variety of colors and designs.

In the example of FIGS. 3A and 3B, the user may be unable to perceive specific colors or, perhaps, differentiate between two different colors. In such an instance, objects that might overlap with this constraint may be enhanced in the environment 310 through altering the look of the object, which is represented in FIG. 3B by 314 and 316. In the case of 314, the color, e.g., of an object 312 as depicted in FIG. 3A, may be changed, or the contrast changed to make 314 stand out. In the case of 316, a pattern may be applied over the object, e.g., the object previously referred to as object 312 in FIG. 3A, in the field of view to make 316 stand out to the user. These alterations may assist the user in selecting which object they may wish to purchase in the grocery store.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
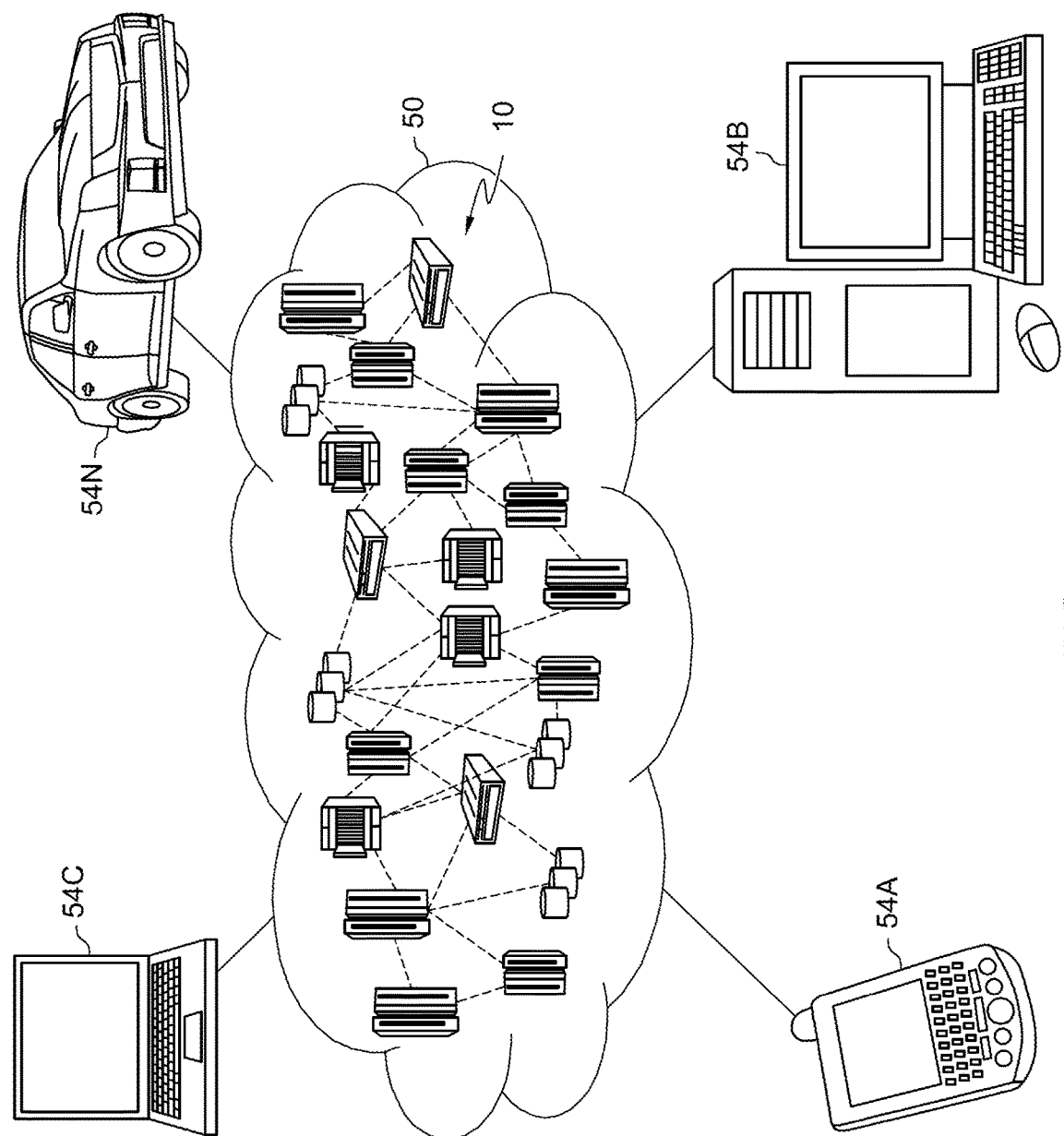
FIG. 4 depicts a cloud computing environment according to an embodiment.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
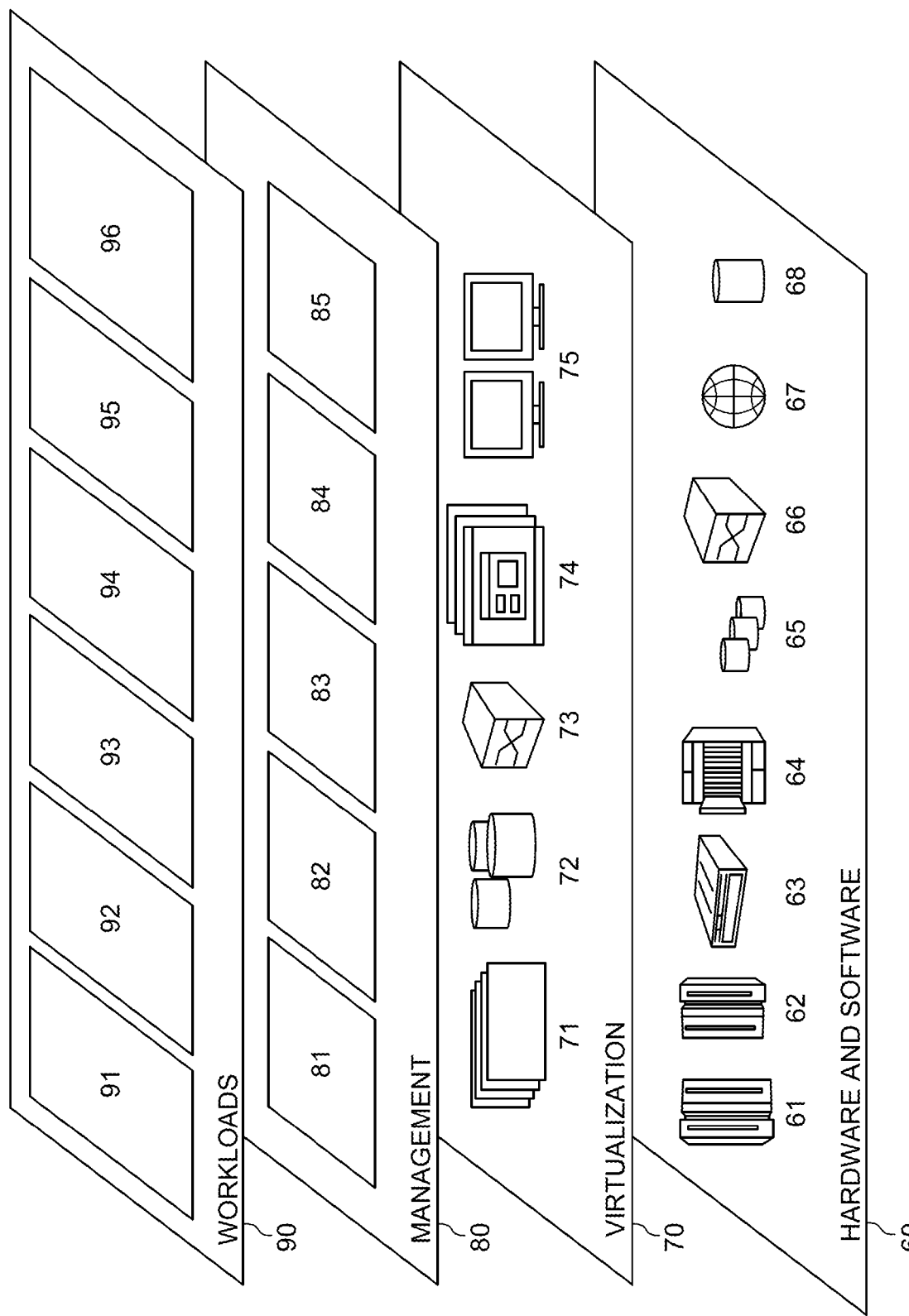
FIG. 5 depicts abstraction model layers according to an embodiment.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66, such as a load balancer. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include mapping and navigation 91; software development and lifecycle management 92; virtual classroom education delivery 93; data analytics processing 94; transaction processing 95; and applications to enhance user interactions with augmented reality environments 96. Enhancing user interactions with augmented reality environments may refer to enhancing objects in a user's field of view according to specific user constraints to improve their experience within the environment.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for enhancing user interaction within an augmented reality environment, the method comprising:
    obtaining a user profile, wherein the user profile includes a constraint of a user;
    identifying a plurality of objects in the augmented reality environment;
    determining an intent of the user with respect to navigating the augmented reality environment;
    calculating a probability of interaction between the user and an identified object based on the intent; and
    generating an enhancement threshold for each of the identified objects based on the probability of interaction and the constraint of the user.

2. The computer-implemented method of claim 1, further comprising:
    predicting a path of the user in the augmented reality environment based on the intent;
    generating a weight for each identified object along the predicted path; and
    applying the weight to the calculation of the probability of interaction between the user and the identified object.

3. The computer-implemented method of claim 1, further comprising using a machine learning classification model to predict the intent of the user with respect to navigating the environment.

4. The computer-implemented method of claim 1, wherein determining the intent of the user further comprises:
    monitoring user movements in the augmented reality environment; and
    updating the intent of the user based on the user movements in the augmented reality environment.

5. The computer-implemented method of claim 1, wherein generating the enhancement threshold further comprises:
    determining whether the constraint of the user applies to the identified object; and
    in response to determining that the constraint applies to the identified object, updating the enhancement threshold for the identified object based on the constraint of the user.

6. The computer-implemented method of claim 1, further comprising updating the user profile to include the intent of the user.

7. The computer-implemented method of claim 1, further comprising updating the user profile to include the calculated probability of interaction between the user and the identified object.

8. A computer system for enhancing user interaction within an augmented reality environment, the system comprising:
    one or more processors, one or more computer-readable memories, one or more computer-readable tangible storage media, and program instructions stored on at least one of the one or more tangible storage media for execution by at least one of the one or more processors via at least one of the one or more memories, wherein the computer system is capable of performing a method comprising:
        obtaining a user profile, wherein the user profile includes a constraint of a user;
        identifying a plurality of objects in the augmented reality environment;
        determining an intent of the user with respect to navigating the augmented reality environment;
        calculating a probability of interaction between the user and an identified object based on the intent; and
        generating an enhancement threshold for each of the identified objects based on the probability of interaction and the constraint of the user.

9. The computer system of claim 8, further comprising:
    predicting a path of the user in the augmented reality environment based on the intent;
    generating a weight for each identified object along the predicted path; and
    applying the weight to the calculation of the probability of interaction between the user and the identified object.

10. The computer system of claim 8, further comprising using a machine learning classification model to predict the intent of the user with respect to navigating the environment.

11. The computer system of claim 8, wherein determining the intent of the user further comprises:
    monitoring user movements in the augmented reality environment; and
    updating the intent of the user based on the user movements in the augmented reality environment.

12. The computer system of claim 8, wherein generating the enhancement threshold further comprises:
    determining whether the constraint of the user applies to the identified object; and
    in response to determining that the constraint applies to the identified object, updating the enhancement threshold for the identified object based on the constraint of the user.

13. The computer system of claim 8, further comprising updating the user profile to include the intent of the user.

14. The computer system of claim 8, further comprising updating the user profile to include the calculated probability of interaction between the user and the identified object.

15. A computer program product for enhancing user interaction within an augmented reality environment, the computer program product comprising:
    a computer readable storage medium having program instructions embodied therewith, the program instructions executable by a processor to cause the processor to perform a method comprising:
        obtaining a user profile, wherein the user profile includes a constraint of a user;
        identifying a plurality of objects in the augmented reality environment;
        determining an intent of the user with respect to navigating the augmented reality environment;
        calculating a probability of interaction between the user and an identified object based on the intent; and generating an enhancement threshold for each of the identified objects based on the probability of interaction and the constraint of the user.

16. The computer program product of claim 15, further comprising:
predicting a path of the user in the augmented reality environment based on the intent;
generating a weight for each identified object along the predicted path; and
applying the weight to the calculation of the probability of interaction between the user and the identified object.

17. The computer program product of claim 15, further comprising using a machine learning classification model to predict the intent of the user with respect to navigating the environment.

18. The computer program product of claim 15, wherein determining the intent of the user further comprises:
monitoring user movements in the augmented reality environment; and
updating the intent of the user based on the user movements in the augmented reality environment.

19. The computer program product of claim 15, wherein generating the enhancement threshold further comprises:
determining whether the constraint of the user applies to the identified object; and
in response to determining that the constraint applies to the identified object, updating the enhancement threshold for the identified object based on the constraint of the user.

20. The computer program product of claim 15, further comprising updating the user profile to include the calculated probability of interaction between the user and the identified object.

* * * * *